United States Patent [19]

Tynan

[11] Patent Number: 5,505,591
[45] Date of Patent: Apr. 9, 1996

[54] APPARATUS FOR PROCESSING MATERIALS

[76] Inventor: Daniel G. Tynan, 115 Nevada Ave., Wilmington, Del. 19803

[21] Appl. No.: 314,109

[22] Filed: Sep. 28, 1994

Related U.S. Application Data

[63] Continuation of Ser. No. 100,015, Jul. 30, 1993, abandoned.
[51] Int. Cl.$^6$ .............................. B29B 7/00; F04B 23/08
[52] U.S. Cl. .................... 417/205; 417/430; 366/301; 366/85; 418/206
[58] Field of Search ........................ 417/199.1, 410, 417/430, 205; 418/206, 15; 425/204; 366/85, 97, 301

[56] References Cited

U.S. PATENT DOCUMENTS

| | | |
|---|---|---|
| 2,502,563 | 4/1950 | Goodchild . |
| 3,349,713 | 10/1967 | Fassbender . |
| 3,420,180 | 1/1969 | Behrends et al. ............... 418/15 |
| 3,548,742 | 12/1970 | Seufert et al. . |
| 3,746,481 | 7/1973 | Schippers ................... 418/206 |
| 3,831,906 | 8/1974 | Wakeman ................... 418/15 |
| 4,015,828 | 4/1977 | Miles . |
| 4,025,056 | 5/1977 | Miles et al. . |
| 4,137,023 | 1/1979 | Moked et al. ............... 418/15 |
| 4,338,274 | 7/1982 | Hill . |
| 4,462,770 | 7/1984 | Haupt ..................... 418/206 |
| 4,474,475 | 10/1984 | Moriyama ................. 366/85 |
| 4,556,324 | 12/1985 | Tynan ..................... 366/85 |
| 4,605,309 | 8/1986 | Albers . |
| 4,802,140 | 1/1989 | Dowling .................. 425/204 |
| 4,890,996 | 1/1990 | Shimizu .................. 425/204 |
| 5,005,982 | 4/1991 | Kistner . |
| 5,045,325 | 9/1991 | Lesko et al. ............... 366/85 |

FOREIGN PATENT DOCUMENTS

| | | | |
|---|---|---|---|
| 3833777 | 5/1989 | Germany . | |
| 53688 | 3/1983 | Japan ................... | 418/206 |
| 931965 | 3/1980 | U.S.S.R. ................. | 418/206 |
| 1298198 | 11/1972 | United Kingdom ........... | 418/206 |

OTHER PUBLICATIONS

Grace et al., *Dispersion in High Viscosity Immiscible Fluid Systems and Application of Static Mixers as Dispersion Devices in Such Systems*, Chem. Eng. Commun., vol. 14, pp. 225–277.

Erwin, *Theory of Laminar Mixing*, Poly. Engg & Science, vol. 18, No. 13, Oct. 1978.

Primary Examiner—Richard A. Bertsch
Assistant Examiner—Roland G. McAndrews, Jr.

[57] ABSTRACT

An apparatus for processing materials, such as mixing or homogenizing fluids or dispersing a fluid in a viscous material, comprises a housing having bores and at least one inlet port and an outlet port disposed in the housing and in fluid communication with the bores. A pressure mechanism is disposed outside the housing and is in communication with the inlet port for introducing the materials under pressure to the bore and for forcing the materials through the bores to the outlet port. A rotor is disposed in each bore. The rotors do not contact each other. Each rotor has teeth, and the teeth of one rotor mesh with the teeth of an adjacent rotor so that the materials are squeezed in the space between two adjacent teeth of one rotor and the meshing tooth of the other rotor to impart stretching flow to the materials and to expel the materials from the interstices between the teeth of the one rotor and the other rotor.

8 Claims, 3 Drawing Sheets

APPARATUS FOR PROCESSING MATERIALS

This is a continuation, of application Ser. No. 08/100,015 filed Jul. 30, 1993, now abandoned.

FIELD OF THE INVENTION

The present invention relates to an apparatus for processing materials, and more particularly for mixing, dispersing and homogenizing polymer melts of different viscosities.

DESCRIPTION OF THE RELATED ART

Gear pumps for mixing liquids are known in the art, as described in, for example, U.S. Pat. No. 4,025,056 to Miles et al. In this gear pump, one gear drives the other to pump the liquid, and contact between the gears precludes passing liquid through the nip zone between the gears. Grooves, or apertures, are cut in the gear teeth to allow backflow necessary for good mixing in this type of mixer. This formation of grooves results in reduced pumping efficiency, which in turn results in an additional energy input to the liquids. This additional energy input may result in an excessive temperature rise of the liquids.

Another known gear pump, as disclosed in U.S. Pat. No. 3,349,713 to Fassbender, similarly achieves mixing of liquids of differing viscosities and has gear teeth which are relieved. However, in this gear pump, the gears rotate in directions opposite to a conventional gear pump to drive the fluid through the nip zone. This patent again describes one gear driving the other. Because the teeth are relieved to provide leak paths, this gear pump suffers the same inefficient pumping coupled with high energy input as in Miles et al.

An apparatus for processing viscous polymers is disclosed in U.S. Pat. No. 4,556,324 to Tynan. The apparatus comprises a plurality of counter-rotating rotors having a clearance therebetween. The orientation of the rotors varies along the longitudinal direction of the apparatus, and the rotors are configured so as to convey, or transport, the polymers in an axial direction. The main objective of this apparatus is to generate a film or fluid surface to remove volatiles from the polymer being processed. Thus, the apparatus runs in a partially filled condition.

It has been shown that if the absolute viscosity of a disperse phase in a mixture of two immiscible, Newtonian fluids exceeds that of the continuous phase by a ratio of 3.5 or more, the break-up of the disperse phase in the continuous phase cannot be accomplished by means of rotational shear flow. See H. P. Grace, "Dispersion Phenomena High Viscosity Immiscible Fluid Systems and Application of Static Mixers as Dispersion Devices in Such Systems", published in *Chemical Engineering Communication*, Vol. 14, 225 277 (1982). Further, such break-up is possible (even though the disperse phase is 3.5 times, or more, as viscous as the continuous phase) by means of irrotational shear, i.e., extensional flow. See D. G. Tynan, "How to Select the Proper Static Mixing Device for Your Application", Proc. Fiber Producer Conf. 1981, Clemson University. Irrotational, or extensional shear flow, or what may be referred to as "stretching flow" has been shown to be a much more efficient means of accomplishing simple mixing than simple shear flow. See L. Erwin, "Theory of Laminar Mixing", *Polym. Engg. & Sci.*, 18 No. 13 (Oct., 1978).

SUMMARY OF THE INVENTION

Accordingly, the present invention solves the problems of the prior art by producing irrotational shear flow, thereby achieving a much more efficient means of accomplishing a simple processing operation, such as mixing, than that accomplished by simple shear flow.

The present invention solves the problems of the prior art by achieving an efficient mixing scheme with a minimal input of unwanted heat to the material being processed.

To achieve the foregoing solutions, and in accordance with the purposes of the invention as embodied and broadly described herein, there is provided an apparatus for processing materials. The apparatus comprises a housing having a plurality of bores; at least one inlet port and an outlet port disposed in the housing, both the inlet port and the outlet port being in fluid communication with the bores; a plurality of non-contacting, counter-rotating rotors each disposed in a respective bore in the housing, each rotor having a plurality of teeth, the teeth of one rotor meshing with the teeth of an adjacent rotor so that the materials are squeezed in the space between two adjacent teeth of one rotor and the meshing tooth of the other rotor to impart stretching flow to the materials and to expel the materials from the interstices between the teeth of one rotor and the other rotor; and a pressure mechanism disposed outside the housing for introducing the materials under pressure to the bores and for forcing the materials through the bores to the outlet port.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiments given below, serve to explain the principles of the invention.

DESCRIPTION OF THE PREFERRED EMBODIMENTS

Reference will now be made in detail to the present preferred embodiments of the invention as illustrated in the accompanying drawings.

In accordance with the present invention, there is provided an apparatus for processing materials. The term "materials" as used herein may mean a fluid, or a fluid with another substance, e.g., sand, clay, minerals, etc. mixed therein. The apparatus of the present invention may be used to process two different materials, as when one material is dispersed in another, different material, or it may be used to process the same material. The term "processing" may mean mixing, and in addition, or alternatively, homogenizing, meaning to reduce to small particles or droplets of near uniform size and to distribute evenly. The term "processing" may, in addition, or alternatively, mean dispersing a fluid, which could be a liquid or a viscous material, in a viscous material, which could be a fluid with small particles or droplets of another material in it.

Figure 1:
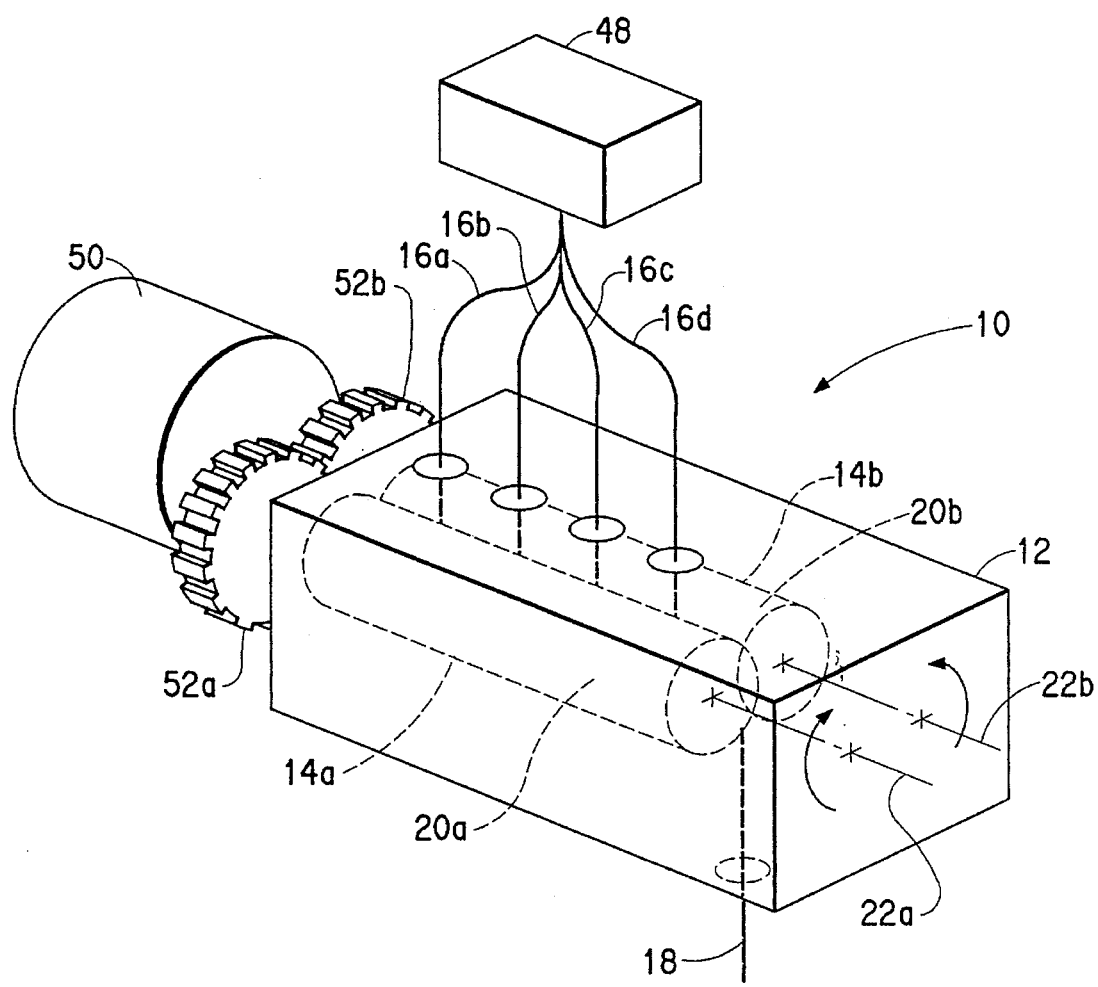
FIG. 1 is a perspective view of the apparatus of the present invention.
Figure 2:
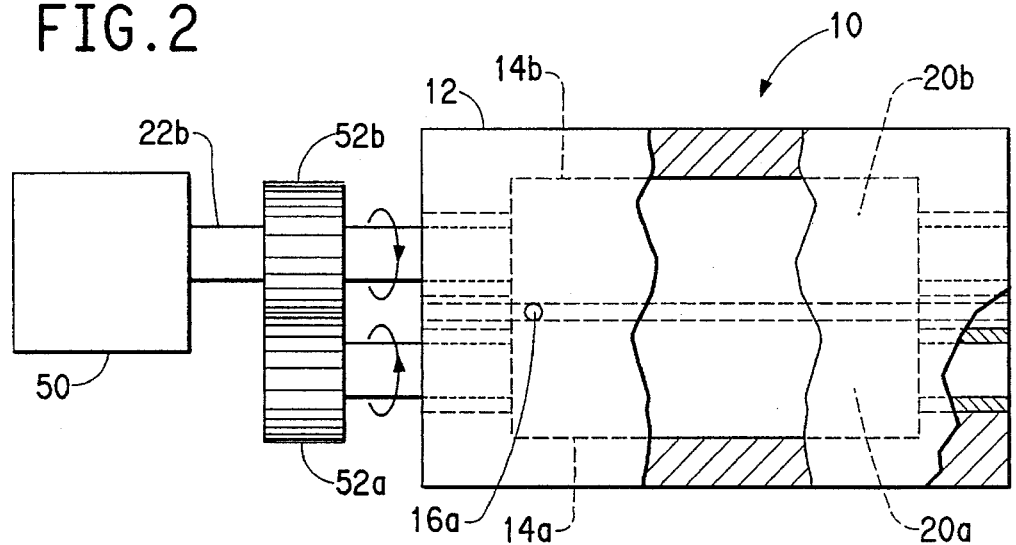
FIG. 2 is a plan view of the apparatus of the present invention.
Figure 3:
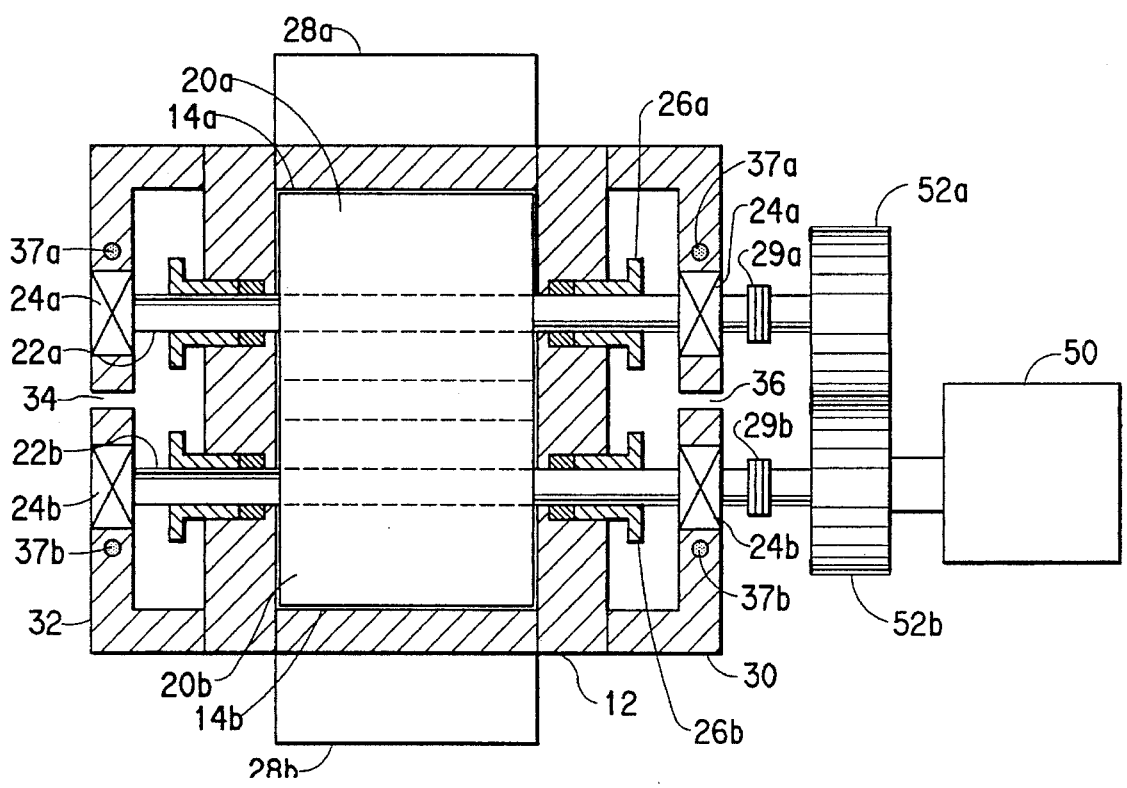
FIG. 3 is a schematic, longitudinal, cross-sectional view of the apparatus of the present invention.

The apparatus of the present invention is shown generally at 10 in FIGS. 1 and 2. The apparatus of the present invention comprises a housing 12 as shown in FIGS. 1–3. Housing 12 has a plurality of bores 14a and 14b formed therein as shown in FIGS. 1–4.

The apparatus of the present invention also comprises at least one inlet port 16a as shown in FIGS. 1 and 2 and an outlet port 18 as shown in FIG. 1 disposed in the housing. Both the inlet port and the outlet port are in fluid communication with bores 14a and 14b. The outlet port as shown in FIG. 1 is sufficiently restricted by virtue of its proportions or, alternatively, by means of an orifice or valve or other obstacle to flow to ensure that the apparatus can run full (i.e., has enough material therein to operate). In certain situations (such as when the viscosity of what will become the dispersed phase is significantly higher than what will be the continuous phase), it may be preferable to provide the apparatus of the present invention with a plurality of inlet ports for staging the feeding of at least one of the materials, as disclosed in commonly owned, earlier filed co-pending application Ser. No. 08/067,248, which is incorporated herein by reference. Although four inlet ports, 16a–16d are shown in FIG. 1, it should be understood that any number of inlet ports may be used, depending on the degree of staged feeding desired or the number of materials to be introduced. It may also be desirable to use multiple ports in order to feed a plurality of materials without staged feeding.

The apparatus of the present invention also comprises a plurality of non-contacting, counter-rotating rotors 20a and 20b each disposed in a respective bore 14a and 14b in the housing. The rotors rotate in opposite directions, as shown by the arrows in FIGS. 1, 2 and 4. The cross-section of the rotors may be constant along the longitudinal length thereof, and the orientation of the rotors may be constant. Alternatively, it is within the scope of the present invention for the cross-section of the rotors to vary, and the orientation of the rotors to vary. Rotors 20a and 20b are disposed for rotation on respective shafts 22a and 22b as shown in FIGS. 1–3, which are journaled in bearings 24a and 24b as shown in FIG. 3. The ends of the shafts are sealed in packing glands or mechanical seals 26a and 26b, respectively, as shown in FIG. 3 and are coupled by a pair of couplings 29a and 29b, which allow for axial misalignment caused by differential thermal expansion. Because the apparatus of the present invention can be constructed with a relatively high length to diameter ratio (although it need not be), the temperature of the materials can be varied along the length of the apparatus by employing a number of external heaters 28a and 28b as shown in FIG. 3, which keep the material, (e.g., thermoplastic molten nylon) hot and which are operated at different temperatures.

The apparatus of the present invention further includes a first bearing mount 30 and a second bearing mount 32, each disposed axially adjacent the housing. The first and second bearing mounts are cut as shown at 34 and 36 in FIG. 3 to allow for differential thermal expansion between the housing, the bearing mounts and the gears. Also, coolant passages 37a and 37b are formed in the bearing mounts to provide cooling fluid to keep the bearings cool.

Figure 4:
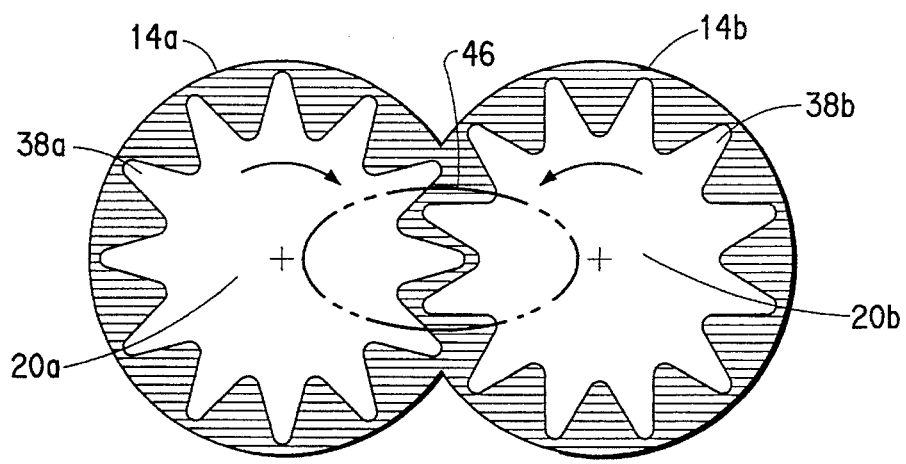
FIG. 4 is a transverse view of the meshing rotors and bores of the apparatus of the present invention.
Figures 5A, 5B:
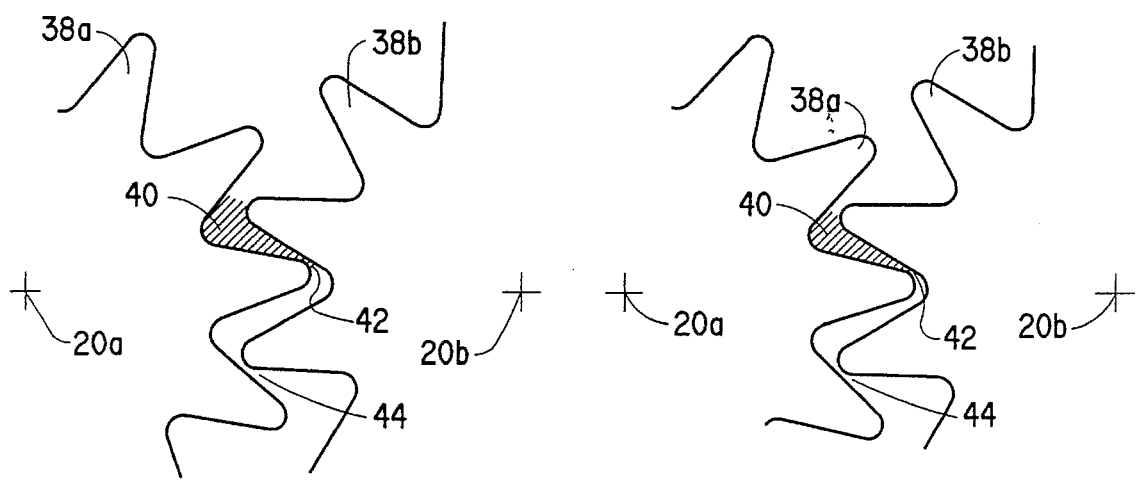
FIGS. 5A–5C are schematic views showing the operation of the rotors of the apparatus of the present invention.
Figure 5C:
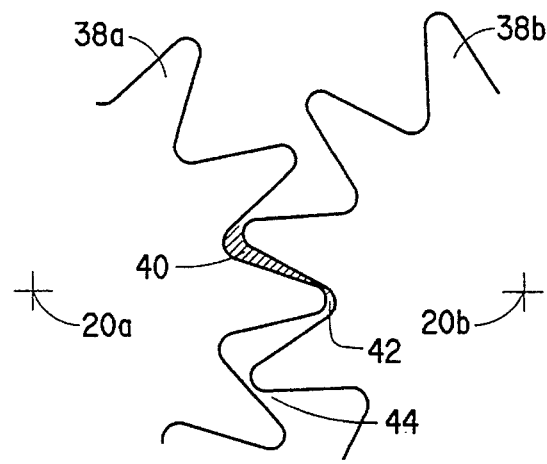

As can be seen from FIGS. 4 and 5, each rotor 20a and 20b has a plurality of teeth 38a and 38b respectively. Teeth 38a of rotor 20a mesh with teeth 38b of adjacent rotor 20b so that the materials are squeezed in a space 40 formed between two adjacent teeth of one rotor, 20a, and the meshing tooth 38b of the other rotor, 20b. The materials are squeezed in space 40 since the rotors, and thus the teeth, do not contact each other. Referring to FIGS. 5A–5C, the meshing action of rotor teeth 38a and 38b is such that material in space 40 trapped between the faces of teeth on the opposing rotors 20a and 20b is squeezed through a plurality of interstices 42 and 44 formed between the teeth of the opposing rotors in the locations at which the clearances between the teeth are the smallest. By squeezing, it is meant that the volume of space 40, formed between the faces of the teeth on opposing rotors, diminishes with time as the rotors are rotated. The material is therefore expelled from the interstices between the teeth. The interstices act essentially as slots. Expelling the material from these slots induces a high order of stretching flow, which is known to be efficacious in the mixing of materials, and especially in the preparation of dispersions in viscous media. Stretching flow means that there is a flow field such that the velocity of the material changes relative to the direction of the flow.

The rotor geometry is best described by referring to FIGS. 4 and 5A–C. In the present invention, it is preferred for the rotors to have the same size and shape and rotate at equal rotational velocity. However, it is possible with the apparatus of the present invention for the rotors to have a different size and shape and to rotate at different rotational velocities. It is also within the scope of the present invention to use tooth shapes for both rotors which are different than those shown in FIGS. 4 and 5A–C. For instance, the teeth may have an involute profile.

The region where the teeth of one rotor mesh with the teeth of the other rotor is referred to as a nip zone, which is shown by a dotted oval 46 in FIG. 4. The nip zone is defined as the zone in which a circle which circumscribes the tips of the teeth on one rotor passes inside the circle which circumscribes the tips of the teeth of the opposing rotor. In the present invention, the rotors are able to move material circumferentially in the bores, but induce no net flow in the longitudinal direction, from the inlet port to the outlet port. Thus, during each revolution of the rotors, all the material entrained in the apparatus of the present invention is transported through the nip zone, where it is forced to flow through the spaces between two adjacent teeth on one rotor and an intersecting tooth, in a manner conducive to the preparation of dispersion and the breaking-up of single or multi-phase non-homogeneities.

The apparatus of the present invention also comprises pressure means disposed outside the housing for introducing the materials under pressure to the bores and for forcing the materials through the bores to the outlet port. The pressure means may comprise a pump 48 as shown in FIG. 1, or any other pressurized source, such as a blow case, in which a head of pressurized gas is disposed over fluid in a pressure vessel. As shown in FIG. 1, pump 48 is disposed outside the housing and in communication with the inlet port. It is also within the scope of the present invention to have separate pumps for each material, or to have one pump for multiple materials, where the materials are pre-mixed together in the pump.

The apparatus of the present invention also comprises a drive assembly 50 disposed outside the housing for driving the rotors in synchronization in opposite rotational directions. Preferably, the drive assembly comprises a motor. A plurality of gears 52a and 52b are also disposed outside housing 12 and synchronize the rotation of the rotors. Drive assembly 50 imparts rotation to gears 52a and 52b and also to shafts 22a and 22b, and thus to rotors 20a and 20b.

In the present invention, the rotors are externally driven by the drive assembly and do not provide longitudinal pumping along the length thereof. In contrast, in the referenced mixers or gear pumps of the prior art, the rotors provide pumping. Moreover, since the rotors of the present invention are externally driven, the teeth of one rotor never touch the teeth of the other rotor. This allows a clearance to be maintained between the teeth of the opposing rotors so that the material may be driven through the nip zone between the rotors. This could not be done if one rotor drives the opposing rotor as in some prior art devices, since doing so would form a seal at the nip zone.

As described above, material is carried around the apparatus of the present invention in the spaces formed between the flanks and the roots of the rotor teeth and the bores of the housing. This circumferential transport of material takes place at a speed equal to the rotational speed of the rotors. Consequently, the number of times that a given volume of material will be treated in the nip zone equals its residence time in the apparatus times the rotor speed. The given volume of material goes through the nip zone once per revolution. The mean residence time, for a given volume of material, is the free volume of the apparatus divided by the volumetric flow rate (i.e., the rate at which material flows through the apparatus). Because residence time in the apparatus of the present invention is solely a function of the rate at which material flows through the apparatus and the free volume of the apparatus, residence time is regulated independently of rotor speed. From the above, it follows that mixing intensity, which is a function of rotor speed, can be varied independently of throughput rate.

The invention will be further clarified by the following Example, which is intended to be purely exemplary of the invention. In a preferred embodiment, as described in the Example below, the materials processed are polymers, specifically nylon and rubber. The present invention may work with a variety of polymers. The apparatus of the present invention is particularly useful for mixing a first and second polymer, where the melt viscosity of the first polymer is at least 3.5 times the melt viscosity of the second polymer. For instance, the first polymer may be an elastomer, such as the dipolymer ethylene/propylene, the terpolymer ethylene/propylene/diene (EPDM) or a tetrapolymer, etc., wherein a portion of the elastomer has reactive functional groups. The second polymer may be a thermoplastic polyamide, such as nylon. Other polymers may include, but are not limited to, the following: polyethylene terephthalate (PET), functionalized synthetic rubber, copolymers of styrene, such as styrene maleic anhydride copolymer, functionalized styrene hydrogenated butadiene block copolymer, sold under the trademark Kraton® by Shell Chemical Company of Houston, Tex., polybutylene terephthalate (PBT), ethylene/glycidal methacrylate copolymer and ethylene/acrylate/glycidal methacrylate copolymer. Also, it should be realized that it is within the scope of the present invention to mix the polymers when other substances, such as anti-oxidant, colorant or solid filler are present.

EXAMPLE

In this Example, a rubber-toughened nylon was prepared in the apparatus of the present invention. The apparatus was charged with 10 parts nylon 66, sold under the trademark Zytel® 101 (hereinafter referred to as Zytel® 101) by E. I. du Pont de Nemours and Company of Wilmington, Del., (hereinafter referred to as DuPont), 9 parts ethylene/propylene/diene, sold under the trademark Nordel® 2744 (hereinafter referred to as Nordel® 2744) by DuPont, and 10 parts ethylene/propylene/diene with fumaric acid functionality, designated as TRX 101.

The ingredients (Zytel® 101, Nordel® 2744 and TRX 101) were dried separately under vacuum for 16 hours at 100° C. The ingredients were then added to the apparatus of the present invention at a metal temperature of 290° C. in a quiescent state and allowed to melt. The ingredients were then mixed at a rotor speed of 200 rpm for one minute. Three more sequential additions of Zytel® 101 were made adding 15 parts, 22 parts and 34 parts, respectively. Each time the Zytel® 101 was added with the rotors still, and it was allowed to melt in a quiescent state. Subsequently, the ingredients were mixed at a rotor speed of 200 rpm for one minute, the rotors turned off, and the procedure repeated. This procedure ensured that an initial dispersion of nylon in rubber occurred, followed by an inversion to rubber in nylon when sufficient nylon had been added.

Transmission electron microscopy (T.E.M.) photomicrographs of the quenched and molded mixture were prepared. The dispersion was judged to be homogeneous by visual inspection of the photomicrographs.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. An apparatus for processing materials, comprising:
   (a) a housing having a plurality of bores;
   (b) at least one inlet port and an outlet port disposed in the housing, both the inlet port and the outlet port being in fluid communication with the bores;
   (c) means for moving the materials circumferentially in the bores without inducing net flow in the longitudinal direction from the inlet port to the outlet port, the moving means comprising a plurality of non-contacting, counter-rotating rotors each disposed in a respective bore in the housing, each rotor having a plurality of teeth, the teeth of one rotor meshing with the teeth of an adjacent rotor so that the materials are squeezed in the space between two adjacent teeth of one rotor and the meshing tooth of the other rotor to impart stretching flow to the materials and to expel the materials from the interstices between the teeth of one rotor and the other rotor; and
   (d) pressure means disposed outside the housing and in communication with the at least one inlet port for introducing the materials under pressure to the bores and for forcing the material through the bores to the outlet port.

2. The apparatus of claim 1, further including a drive assembly disposed outside the housing for driving the rotors.

3. The apparatus of claim 1, wherein the at least one inlet port comprises a plurality of inlet ports for staging the feeding of at least one of the materials.

4. The apparatus of claim 1, wherein the materials are polymers.

5. The apparatus of claim 1, further including a plurality of gears for synchronizing the rotation of the rotors.

6. The apparatus of claim 5, further including a first bearing mount and a second bearing mount each disposed axially adjacent the housing.

7. The apparatus of claim 6, wherein the first and second bearing mounts are cut for allowing for differential thermal expansion between the housing, the first and second bearing mounts and the gears.

8. An apparatus for dispersing a fluid in a viscous material, comprising:
- (a) a housing having a plurality of bores;
- (b) an inlet port disposed in the housing in fluid communication with the bores;
- (c) an outlet port disposed in the housing in fluid communication with the bores;
- (d) pump means disposed outside the housing and in fluid communication with the inlet port for introducing both the fluid and the viscous material under pressure to the bores and for forcing the fluid and the materials through the bores to the outlet port;
- (e) means for moving the fluid and the materials circumferentially in the bores without inducing net flow in the longitudinal direction from the inlet port to the outlet port, the moving means comprising a pair of non-contacting, counter-rotating rotors each disposed in a respective bore in the housing; and;
- (f) a drive assembly disposed outside the housing for driving the rotors in synchronization in opposite rotational directions.

* * * * *